US009125787B2

(12) United States Patent
Malhi et al.

(10) Patent No.: US 9,125,787 B2
(45) Date of Patent: Sep. 8, 2015

(54) COMPRESSION GARMENT HAVING A FOAM LAYER

(75) Inventors: Arnaz S. Malhi, Watertown, MA (US); Raymond C. Avitable, Westborough, MA (US)

(73) Assignee: Covidien LP, Mansfield, MA (US)

( * ) Notice: Subject to any disclaimer, the term of this patent is extended or adjusted under 35 U.S.C. 154(b) by 705 days.

(21) Appl. No.: 13/249,390

(22) Filed: Sep. 30, 2011

(65) Prior Publication Data

US 2013/0085432 A1    Apr. 4, 2013

(51) Int. Cl.
| | |
|---|---|
| *A61H 9/00* | (2006.01) |
| *B29L 31/00* | (2006.01) |
| *B29L 22/02* | (2006.01) |
| *B29C 65/08* | (2006.01) |
| *B29C 65/48* | (2006.01) |
| *B29C 65/00* | (2006.01) |
| *B29C 65/02* | (2006.01) |

(52) U.S. Cl.
CPC ............ *A61H 9/0078* (2013.01); *A61H 9/0092* (2013.01); *A61H 2201/0192* (2013.01); *A61H 2201/165* (2013.01); *A61H 2201/5002* (2013.01); *A61H 2205/06* (2013.01); *A61H 2205/10* (2013.01); *A61H 2209/00* (2013.01); *B29C 65/02* (2013.01); *B29C 65/08* (2013.01); *B29C 65/48* (2013.01); *B29C 66/1122* (2013.01); *B29C 66/436* (2013.01); *B29C 66/727* (2013.01); *B29L 2022/025* (2013.01); *B29L 2031/753* (2013.01)

(58) Field of Classification Search
CPC ..... A61H 9/00; A61H 9/0078; A61H 9/0092; A61H 2205/06; A61H 2205/10; A61H 2209/00; B29L 2031/753; B29L 2022/025; B29C 65/08; B29C 65/48; B29C 65/02; B29C 66/1122; B29C 66/436; B29C 66/727
USPC .................................. 601/148–152; 602/13
See application file for complete search history.

(56) References Cited

U.S. PATENT DOCUMENTS

| | | |
|---|---|---|
| 908,959 A | 1/1909 | Cooke |
| 2,489,388 A | 11/1949 | Rubin |
| 3,473,527 A | 10/1969 | Spiro |
| 3,504,675 A | 4/1970 | Bishop, Jr. |
| 3,703,171 A | 11/1972 | Schiavitto |
| 3,824,492 A | 7/1974 | Brienza et al. |
| 3,831,467 A | 8/1974 | Moore |
| 3,868,952 A | 3/1975 | Hatton |
| 3,934,583 A | 1/1976 | Hollingshead et al. |
| 3,945,047 A | 3/1976 | Jarrell, Jr. |

(Continued)

FOREIGN PATENT DOCUMENTS

| | | |
|---|---|---|
| AU | 2008234965 A1 | 5/2009 |
| DE | 8115670 U1 | 8/1981 |

(Continued)

*Primary Examiner* — Justine Yu
*Assistant Examiner* — Timothy Stanis
(74) *Attorney, Agent, or Firm* — John Paul Mello, Esq.

(57) ABSTRACT

A compression garment for applying compression therapy to a body part of a person. The compression garment includes a bladder including an inflatable chamber having a perimeter and an opening through which the inflatable chamber is inflated. A foam layer is positioned at least partially in the inflatable chamber for reducing a volume of gas required to inflate the inflatable chamber and extends at least partially outside the inflatable chamber for providing structural support to the compression garment.

16 Claims, 9 Drawing Sheets

(56) References Cited

U.S. PATENT DOCUMENTS

| | | | |
|---|---|---|---|
| 4,021,860 A | 5/1977 | Swallow et al. | |
| 4,091,804 A | 5/1978 | Hasty | |
| 4,091,864 A | 5/1978 | Cocuzza et al. | |
| 4,116,236 A | 9/1978 | Albert | |
| 4,135,500 A | 1/1979 | Gorran | |
| 4,201,203 A | 5/1980 | Applegate | |
| 4,207,876 A | 6/1980 | Annis | |
| 4,219,892 A | 9/1980 | Rigdon | |
| D259,058 S | 4/1981 | Marshall | |
| 4,320,746 A | 3/1982 | Arkans et al. | |
| 4,340,064 A | 7/1982 | Vale | |
| 4,353,362 A | 10/1982 | DeMarco | |
| 4,363,125 A | 12/1982 | Brewer et al. | |
| 4,375,217 A | 3/1983 | Arkans | |
| 4,402,312 A | 9/1983 | Villari et al. | |
| 4,442,834 A | 4/1984 | Tucker et al. | |
| 4,445,505 A | 5/1984 | Labour et al. | |
| 4,467,484 A | 8/1984 | Nagatake et al. | |
| 4,492,227 A | 1/1985 | Senn et al. | |
| 4,547,919 A | 10/1985 | Wang | |
| 4,628,945 A | 12/1986 | Johnson, Jr. | |
| 4,638,794 A | 1/1987 | Grisar | |
| 4,700,698 A | 10/1987 | Kleylein | |
| 4,702,234 A | 10/1987 | Huntjens | |
| 4,724,831 A | 2/1988 | Huntjens | |
| 4,765,318 A | 8/1988 | Tranberg et al. | |
| 4,811,727 A | 3/1989 | Etienne | |
| 4,872,448 A | 10/1989 | Johnson, Jr. | |
| 4,938,207 A | 7/1990 | Vargo | |
| 4,977,891 A * | 12/1990 | Grim | 602/27 |
| 4,986,263 A | 1/1991 | Dickerson et al. | |
| 4,989,273 A | 2/1991 | Cromartie | |
| 5,107,823 A | 4/1992 | Fratesi | |
| 5,125,400 A | 6/1992 | Johnson, Jr. | |
| 5,134,726 A | 8/1992 | Ross | |
| 5,144,708 A | 9/1992 | Pekar | |
| 5,154,690 A | 10/1992 | Shiono | |
| 5,185,000 A | 2/1993 | Brandt et al. | |
| 5,230,335 A | 7/1993 | Johnson, Jr. et al. | |
| 5,230,695 A | 7/1993 | Silver et al. | |
| 5,261,871 A | 11/1993 | Greenfield | |
| 5,263,923 A | 11/1993 | Fujimoto | |
| 5,306,229 A | 4/1994 | Brandt et al. | |
| 5,314,455 A | 5/1994 | Johnson, Jr. et al. | |
| 5,334,135 A | 8/1994 | Grim et al. | |
| 5,339,020 A | 8/1994 | Siligoni et al. | |
| 5,343,878 A * | 9/1994 | Scarberry et al. | 128/898 |
| 5,353,525 A | 10/1994 | Grim | |
| 5,378,224 A | 1/1995 | Billotti | |
| 5,385,538 A | 1/1995 | Mann | |
| 5,399,153 A | 3/1995 | Caprio, Jr. et al. | |
| 5,407,421 A | 4/1995 | Goldsmith | |
| 5,411,037 A | 5/1995 | Hess et al. | |
| 5,417,720 A | 5/1995 | Mason | |
| 5,419,161 A | 5/1995 | Bodenschatz et al. | |
| 5,449,341 A | 9/1995 | Harris | |
| 5,450,858 A | 9/1995 | Zablotsky et al. | |
| 5,451,201 A | 9/1995 | Prengler | |
| 5,462,517 A | 10/1995 | Mann | |
| 5,466,250 A | 11/1995 | Johnson, Jr. et al. | |
| 5,474,524 A | 12/1995 | Carey | |
| 5,489,259 A | 2/1996 | Jacobs et al. | |
| 5,496,262 A | 3/1996 | Johnson, Jr. et al. | |
| 5,554,105 A | 9/1996 | Taylor | |
| 5,556,374 A | 9/1996 | Grace et al. | |
| 5,582,584 A | 12/1996 | Billotti | |
| 5,584,802 A | 12/1996 | Hess et al. | |
| 5,588,955 A | 12/1996 | Johnson, Jr. et al. | |
| 5,588,956 A | 12/1996 | Billotti | |
| 5,613,943 A | 3/1997 | Palumbo | |
| 5,626,556 A | 5/1997 | Tobler et al. | |
| 5,626,557 A | 5/1997 | Mann | |
| 5,630,792 A | 5/1997 | Neal | |
| 5,640,714 A | 6/1997 | Tanaka | |
| 5,641,322 A | 6/1997 | Silver et al. | |
| 5,657,767 A | 8/1997 | Nelson et al. | |
| 5,683,439 A | 11/1997 | Jensen | |
| 5,690,672 A | 11/1997 | Cohen | |
| 5,693,453 A | 12/1997 | Muroya | |
| 5,695,452 A | 12/1997 | Grim et al. | |
| 5,717,996 A | 2/1998 | Feldmann | |
| 5,720,715 A | 2/1998 | Eriksson | |
| 5,728,055 A | 3/1998 | Sebastian | |
| 5,730,710 A | 3/1998 | Eichhorn et al. | |
| 5,733,249 A | 3/1998 | Katzin et al. | |
| 5,785,669 A | 7/1998 | Proctor et al. | |
| 5,785,673 A | 7/1998 | Billotti | |
| 5,792,084 A | 8/1998 | Wilson et al. | |
| 5,795,312 A | 8/1998 | Dye | |
| 5,797,851 A | 8/1998 | Byrd | |
| 5,823,981 A | 10/1998 | Grim et al. | |
| 5,833,639 A | 11/1998 | Nunes et al. | |
| 5,853,381 A | 12/1998 | Stevenson et al. | |
| 5,876,359 A | 3/1999 | Bock et al. | |
| 5,888,185 A | 3/1999 | Regan | |
| 5,891,071 A | 4/1999 | Stearns et al. | |
| 5,899,207 A | 5/1999 | Scheinberg | |
| 5,925,010 A | 7/1999 | Caprio, Jr. | |
| 6,006,751 A | 12/1999 | Spitzer | |
| 6,076,193 A | 6/2000 | Hood | |
| 6,099,489 A | 8/2000 | Herzberg et al. | |
| 6,126,683 A | 10/2000 | Momtaheni | |
| 6,129,694 A | 10/2000 | Bodenschatz | |
| 6,149,616 A | 11/2000 | Szlema et al. | |
| 6,203,510 B1 * | 3/2001 | Takeuchi et al. | 601/152 |
| 6,228,044 B1 | 5/2001 | Jensen et al. | |
| 6,254,554 B1 | 7/2001 | Turtzo | |
| 6,261,253 B1 | 7/2001 | Katzin | |
| 6,279,160 B1 | 8/2001 | Chen | |
| 6,287,269 B1 | 9/2001 | Osti et al. | |
| 6,290,664 B1 | 9/2001 | Nauert | |
| 6,308,353 B1 | 10/2001 | Van Steenburg | |
| 6,338,722 B1 | 1/2002 | Barbe-Vicuna et al. | |
| 6,385,778 B1 | 5/2002 | Johnson | |
| 6,394,971 B1 | 5/2002 | Slautterback et al. | |
| 6,425,195 B1 | 7/2002 | Donzis | |
| 6,425,876 B1 | 7/2002 | Frangi et al. | |
| 6,467,106 B1 | 10/2002 | Heimbrock | |
| 6,520,926 B2 | 2/2003 | Hall | |
| 6,526,597 B1 | 3/2003 | Shepard | |
| 6,530,941 B1 | 3/2003 | Muller et al. | |
| 6,553,572 B2 | 4/2003 | Fiorini et al. | |
| 6,592,534 B1 | 7/2003 | Rutt et al. | |
| 6,618,859 B1 | 9/2003 | Kadymir et al. | |
| 6,682,547 B2 | 1/2004 | McEwen et al. | |
| 6,689,079 B2 | 2/2004 | Flick et al. | |
| 6,712,780 B2 | 3/2004 | Darcey | |
| 6,849,057 B2 | 2/2005 | Satou et al. | |
| 6,859,965 B1 | 3/2005 | Gourd | |
| 6,923,777 B2 | 8/2005 | Garon | |
| 6,984,846 B2 | 1/2006 | Newns et al. | |
| 6,994,682 B2 | 2/2006 | Bauerfeind et al. | |
| 7,011,640 B2 | 3/2006 | Patterson et al. | |
| 7,014,621 B2 | 3/2006 | Nelson | |
| 7,028,690 B2 | 4/2006 | Schneider et al. | |
| 7,044,924 B1 | 5/2006 | Roth et al. | |
| 7,083,586 B2 | 8/2006 | Simmons et al. | |
| 7,114,188 B1 | 10/2006 | Teigen | |
| 7,173,161 B1 | 2/2007 | Kandt | |
| 7,229,390 B2 | 6/2007 | Fujii et al. | |
| 7,237,272 B2 | 7/2007 | Botcher | |
| 7,238,080 B2 | 7/2007 | Gimble | |
| 7,273,464 B2 | 9/2007 | Reinhardt | |
| 7,282,038 B2 | 10/2007 | Gillis et al. | |
| 7,326,227 B2 | 2/2008 | Dedo et al. | |
| 7,442,175 B2 | 10/2008 | Meyer et al. | |
| 7,465,283 B2 | 12/2008 | Grim et al. | |
| 7,479,577 B2 | 1/2009 | Scheinberg et al. | |
| 7,517,331 B2 | 4/2009 | Reinhardt et al. | |
| 7,559,908 B2 | 7/2009 | Ravikumar | |
| 7,562,541 B2 | 7/2009 | Hermanson et al. | |
| 7,591,797 B2 | 9/2009 | Hakonson et al. | |
| 7,615,027 B2 | 11/2009 | Nordt, III et al. | |
| 7,658,720 B2 | 2/2010 | Johnson, III | |

(56) References Cited

U.S. PATENT DOCUMENTS

| | | |
|---|---|---|
| 7,670,306 B2 | 3/2010 | Nordt, III et al. |
| 7,690,380 B2 | 4/2010 | Lee et al. |
| 7,708,707 B2 | 5/2010 | Cook et al. |
| 7,741,966 B2 | 6/2010 | Bonnefin et al. |
| 7,749,182 B2 | 7/2010 | Gramza et al. |
| 7,780,698 B2 | 8/2010 | McEwen et al. |
| 7,842,000 B2 | 11/2010 | Lai et al. |
| 7,862,527 B2 | 1/2011 | Gramza et al. |
| 7,871,387 B2 | 1/2011 | Tordella et al. |
| 7,909,786 B2 | 3/2011 | Bonnefin et al. |
| 7,931,606 B2 | 4/2011 | Meyer |
| 7,937,771 B2 | 5/2011 | Mazzarolo |
| 7,942,840 B2 | 5/2011 | Hargrave et al. |
| 7,945,970 B2 | 5/2011 | Belluye et al. |
| 7,947,003 B2 | 5/2011 | Bonnefin et al. |
| 8,007,457 B2 | 8/2011 | Taylor |
| 8,016,779 B2 | 9/2011 | Brown et al. |
| 8,021,388 B2 | 9/2011 | Brown et al. |
| 8,029,450 B2 | 10/2011 | Brown et al. |
| 8,029,451 B2 | 10/2011 | Beyer et al. |
| 8,034,007 B2 | 10/2011 | Avitable et al. |
| 8,065,753 B2 | 11/2011 | Sorensen et al. |
| 8,070,699 B2 | 12/2011 | Avitable et al. |
| 8,075,507 B2 | 12/2011 | Linnane et al. |
| 8,109,892 B2 | 2/2012 | Brown et al. |
| 8,114,117 B2 | 2/2012 | Avitable |
| 8,118,762 B2 | 2/2012 | Bort |
| 8,118,765 B2 | 2/2012 | Magnusson |
| 8,128,583 B2 | 3/2012 | Ghatge |
| 8,137,378 B2 | 3/2012 | McEwen et al. |
| 8,142,472 B2 | 3/2012 | McEwen et al. |
| 8,162,861 B2 | 4/2012 | Avitable et al. |
| 8,192,380 B2 | 6/2012 | Nardi |
| 8,419,666 B2 | 4/2013 | Liu et al. |
| 2001/0020142 A1 | 9/2001 | Bird |
| 2002/0068886 A1 | 6/2002 | Lin |
| 2002/0147422 A1 | 10/2002 | Darcey et al. |
| 2003/0028157 A1 | 2/2003 | Jusiak et al. |
| 2003/0171706 A1 | 9/2003 | Nelson |
| 2003/0191420 A1 | 10/2003 | Kuiper et al. |
| 2004/0097855 A1 | 5/2004 | Page et al. |
| 2004/0167456 A1 | 8/2004 | Kingsford et al. |
| 2004/0176715 A1 | 9/2004 | Nelson |
| 2005/0070828 A1 | 3/2005 | Hampson et al. |
| 2005/0131489 A1 | 6/2005 | Gardon-Mollard |
| 2005/0283106 A1 | 12/2005 | Smith et al. |
| 2006/0010574 A1 | 1/2006 | Linnane et al. |
| 2006/0135894 A1 | 6/2006 | Linnane et al. |
| 2006/0189907 A1 | 8/2006 | Pick et al. |
| 2006/0229541 A1 | 10/2006 | Hassler et al. |
| 2006/0287672 A1 | 12/2006 | McEwen et al. |
| 2007/0038167 A1 | 2/2007 | Tabron et al. |
| 2007/0049852 A1 | 3/2007 | Linnane et al. |
| 2007/0060857 A1 | 3/2007 | Testa, Jr. |
| 2007/0135836 A1 | 6/2007 | McEwen et al. |
| 2007/0179210 A1 | 8/2007 | Swaniker |
| 2007/0249976 A1 | 10/2007 | Tucker et al. |
| 2008/0103422 A1 | 5/2008 | Perry et al. |
| 2008/0189829 A1 | 8/2008 | Fusco |
| 2008/0249441 A1* | 10/2008 | Avitable et al. ............... 601/151 |
| 2008/0249443 A1 | 10/2008 | Avitable et al. |
| 2008/0249559 A1 | 10/2008 | Brown et al. |
| 2008/0250551 A1 | 10/2008 | Mazzarolo |
| 2008/0306420 A1 | 12/2008 | Vess |
| 2009/0005717 A1 | 1/2009 | Brzank |
| 2009/0013450 A1 | 1/2009 | Lambertz |
| 2009/0126081 A1 | 5/2009 | Lambertz |
| 2009/0171384 A1 | 7/2009 | Hack |
| 2009/0227918 A1 | 9/2009 | Nardi et al. |
| 2009/0260639 A1 | 10/2009 | Hsu et al. |
| 2009/0281470 A1 | 11/2009 | Sandusky et al. |
| 2009/0312681 A1 | 12/2009 | McSpadden et al. |
| 2009/0326576 A1 | 12/2009 | Ben-Nun |
| 2010/0004575 A1 | 1/2010 | Vess |
| 2010/0016771 A1 | 1/2010 | Arbesman et al. |
| 2010/0022930 A1 | 1/2010 | Koby et al. |
| 2010/0036303 A1 | 2/2010 | Bauerfeind et al. |
| 2010/0037369 A1 | 2/2010 | Reichert |
| 2010/0056966 A1 | 3/2010 | Toth |
| 2010/0081975 A1 | 4/2010 | Avitable et al. |
| 2010/0137776 A1 | 6/2010 | Virkus et al. |
| 2011/0077564 A1 | 3/2011 | Ganapathy et al. |
| 2011/0077565 A1 | 3/2011 | Hanlon et al. |
| 2012/0065664 A1 | 3/2012 | Avitable et al. |

FOREIGN PATENT DOCUMENTS

| | | |
|---|---|---|
| DE | 8123588 U1 | 12/1981 |
| DE | 8503139 U1 | 5/1985 |
| DE | 8514142 U1 | 8/1985 |
| DE | 3416231 A1 | 11/1985 |
| DE | 3511250 A1 | 11/1985 |
| DE | 8529092 U1 | 1/1986 |
| DE | 3637879 A1 | 5/1988 |
| DE | 8800950 U1 | 5/1988 |
| DE | 8808422 U1 | 10/1988 |
| DE | 3838582 A1 | 1/1990 |
| DE | 8910985 U1 | 1/1990 |
| DE | 9004974 U1 | 9/1990 |
| DE | 9112765 U1 | 2/1992 |
| DE | 9015508 U1 | 4/1992 |
| DE | 9115983 U1 | 4/1992 |
| DE | 9113898 U1 | 5/1992 |
| DE | 9300600 U1 | 4/1993 |
| DE | 9300615 U1 | 4/1993 |
| DE | 9304628 U1 | 9/1993 |
| DE | 4103383 C2 | 12/1993 |
| DE | 9316342 U1 | 2/1994 |
| DE | 9317021 U1 | 3/1994 |
| DE | 9408096 U1 | 9/1994 |
| DE | 9417219 U1 | 2/1995 |
| DE | 9417712 U1 | 2/1995 |
| DE | 29519978 U1 | 4/1996 |
| DE | 29519979 U1 | 4/1996 |
| DE | 29519980 U1 | 4/1996 |
| DE | 4091302 C2 | 5/1996 |
| DE | 29803103 U1 | 6/1998 |
| DE | 3802338 C2 | 7/1998 |
| DE | 20022041 U1 | 4/2001 |
| DE | 20020518 U1 | 5/2001 |
| DE | 20005661 U1 | 9/2001 |
| DE | 20005663 U1 | 9/2001 |
| DE | 29824758 U1 | 8/2002 |
| DE | 19849710 C2 | 10/2002 |
| DE | 20203275 U1 | 8/2003 |
| DE | 10305277 A1 | 9/2003 |
| DE | 202004004852 U1 | 7/2004 |
| DE | 102004019007 A1 | 11/2005 |
| DE | 202004013159 U1 | 2/2006 |
| DE | 202005020235 U1 | 4/2006 |
| DE | 102005012338 A1 | 9/2006 |
| DE | 202006009050 U1 | 10/2006 |
| DE | 202009008302 U1 | 9/2009 |
| EP | 0027172 A1 | 4/1981 |
| EP | 0070538 A1 | 1/1983 |
| EP | 0071818 A1 | 2/1983 |
| EP | 0010389 B1 | 6/1983 |
| EP | 0088832 A1 | 9/1983 |
| EP | 0115029 A1 | 8/1984 |
| EP | 0154758 A1 | 9/1985 |
| EP | 0159679 A2 | 10/1985 |
| EP | 0229577 A1 | 7/1987 |
| EP | 0262638 A2 | 4/1988 |
| EP | 0272989 A1 | 6/1988 |
| EP | 0313487 A1 | 4/1989 |
| EP | 0329815 A1 | 8/1989 |
| EP | 0277199 B1 | 1/1992 |
| EP | 0485943 A1 | 5/1992 |
| EP | 0492328 A1 | 7/1992 |
| EP | 0562967 A1 | 9/1993 |
| EP | 0598291 A1 | 5/1994 |
| EP | 0600218 A2 | 6/1994 |
| EP | 0600317 A2 | 6/1994 |
| EP | 0628297 A1 | 12/1994 |

(56) References Cited

FOREIGN PATENT DOCUMENTS

| | | |
|---|---|---|
| EP | 0694296 A1 | 1/1996 |
| EP | 0746286 B1 | 4/1998 |
| EP | 0860153 A1 | 8/1998 |
| EP | 0898949 A1 | 3/1999 |
| EP | 0970670 A1 | 1/2000 |
| EP | 0608223 B1 | 3/2000 |
| EP | 0835085 B1 | 8/2000 |
| EP | 0797933 B1 | 10/2000 |
| EP | 1050287 A1 | 11/2000 |
| EP | 1208822 A2 | 5/2002 |
| EP | 1289455 B1 | 2/2008 |
| EP | 1953284 A2 | 8/2008 |
| EP | 2090273 A2 | 8/2009 |
| FR | 2807644 A1 | 10/2001 |
| GB | 2061086 A | 5/1981 |
| GB | 2212399 A | 7/1989 |
| GB | 2260686 A | 4/1993 |
| GB | 2279255 A | 1/1995 |
| GB | 2300808 A | 11/1996 |
| GB | 2309168 A | 7/1997 |
| GB | 2373444 A | 9/2002 |
| GB | 2438365 A | 11/2007 |
| JP | 2009000277 A | 1/2009 |
| WO | 85/02109 A1 | 5/1985 |
| WO | 88/01855 A1 | 3/1988 |
| WO | 91/01701 A1 | 2/1991 |
| WO | 92/03110 A1 | 3/1992 |
| WO | 92/07527 A1 | 5/1992 |
| WO | 93/20789 A1 | 10/1993 |
| WO | 94/21201 A1 | 9/1994 |
| WO | 95/00084 A1 | 1/1995 |
| WO | 95/01770 A1 | 1/1995 |
| WO | 98/33456 A1 | 8/1998 |
| WO | 00/74619 A1 | 12/2000 |
| WO | 01/03624 A1 | 1/2001 |
| WO | 01/19299 A1 | 3/2001 |
| WO | 01/21119 A1 | 3/2001 |
| WO | 01/47464 A1 | 7/2001 |
| WO | 02/02181 A1 | 1/2002 |
| WO | 02/11827 A1 | 2/2002 |
| WO | 03/041621 A1 | 5/2003 |
| WO | 2004041146 A1 | 5/2004 |
| WO | 2005007045 A1 | 1/2005 |
| WO | 2005060888 A1 | 7/2005 |
| WO | 2005120500 A1 | 12/2005 |
| WO | 2006083865 A2 | 8/2006 |
| WO | 2006091735 A2 | 8/2006 |
| WO | 2007018484 A1 | 2/2007 |
| WO | 2007067076 A1 | 6/2007 |
| WO | 2007111922 A2 | 10/2007 |
| WO | 2007147980 A2 | 12/2007 |
| WO | 2008126963 A1 | 10/2008 |
| WO | 2009015418 A1 | 2/2009 |
| WO | 2009025321 A1 | 2/2009 |
| WO | 2009093180 A1 | 7/2009 |

* cited by examiner

COMPRESSION GARMENT HAVING A FOAM LAYER

FIELD OF THE INVENTION

The present invention is directed generally to a compression garment for applying compression therapy to a body part of a wearer, and more particularly to a compression garment having a foam layer.

BACKGROUND OF THE INVENTION

Among concerns for generally immobile persons are medical conditions that form blood clots, such as deep vein thrombosis (DVT) and peripheral edema. Such patients and persons include those undergoing surgery, anesthesia, extended periods of bed rest, etc. These blood clotting conditions generally occur in the deep veins of the lower extremities and/or pelvis. These veins, such as the iliac, femoral, popliteal, and tibial veins, return deoxygenated blood to the heart. When blood circulation in these veins is retarded due to illness, injury, or inactivity, there is a tendency for blood to accumulate or pool. A static pool of blood may lead to a blood clot, which can interfere with cardiovascular circulation. More seriously, the blood clot can break loose and migrate. A pulmonary embolus, which may be life threatening, can form if the blood clot blocks a pulmonary artery.

Conventional vascular compression systems include a compression garment fluidly connected to a controller that cyclically inflates the compression garment. The cyclical inflation of the compression garment enhances blood circulation and decreases the likelihood of DVT. A system of conduits connects the compression garment to the controller. Newer vascular compression garments may have portable controllers that are much smaller and mountable on the compression garment allowing the patient to move about freely without first removing the compression garment or disconnecting the compression garment from its controller. These newer compression garments may be worn when a patient is stationary or ambulatory and are believed to enhance patient compliance due to convenience of use.

Active compression garments for applying intermittent compression therapy to a body part (e.g., a limb such as a leg) have many applications, including DVT prophylaxis, edema prevention, and wound healing. The performance of compression garments is dependent upon the ability of the garment to retain its initial fit or tightness so the inflatable bladders retain their original position around the body part. This can be very difficult if the compression garments are used when the patients are in certain positions (e.g., non-horizontal positions) or when the patients are moving. The garments tend to loosen around the body part and/or slide down the body part, causing misalignment of inflatable bladders with corresponding body parts, potentially resulting in ineffective compression therapy and/or discomfort. The present invention is directed to maintaining the inflatable bladders in position on the body part to improve applied compression therapy by increasing the efficiency of the compression therapy. In addition, the present invention is directed to reducing an internal volume of one or more bladders on a compression garment, thus reducing an amount of gas required to inflate the bladders.

SUMMARY OF THE INVENTION

In one aspect, the present invention includes a compression garment for applying compression therapy to a body part of a person comprises a bladder conformable to at least a portion of the body part. The bladder includes an inflatable chamber for applying compression therapy to the body part. The inflatable chamber has a perimeter and an opening through which the inflatable chamber is inflated. A foam layer is positioned at least partially in the inflatable chamber for reducing a volume of gas required to inflate the inflatable chamber. The foam layer extends at least partially outside the inflatable chamber for providing structural support to the compression garment.

In another aspect, the present invention includes a method of making a compression garment for applying compression therapy to a body part of a person including sandwiching a foam layer between first and second bladder layers so the foam layer and first and second bladder layers are positioned in a stack. The bladder layers are joined to form an inflatable chamber between the bladder layers such that the foam layer is positioned at least partially in the inflatable chamber and extends out of the inflatable chamber. An opening is formed in at least one of the bladder layers to allow for inflation of the inflatable chamber.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
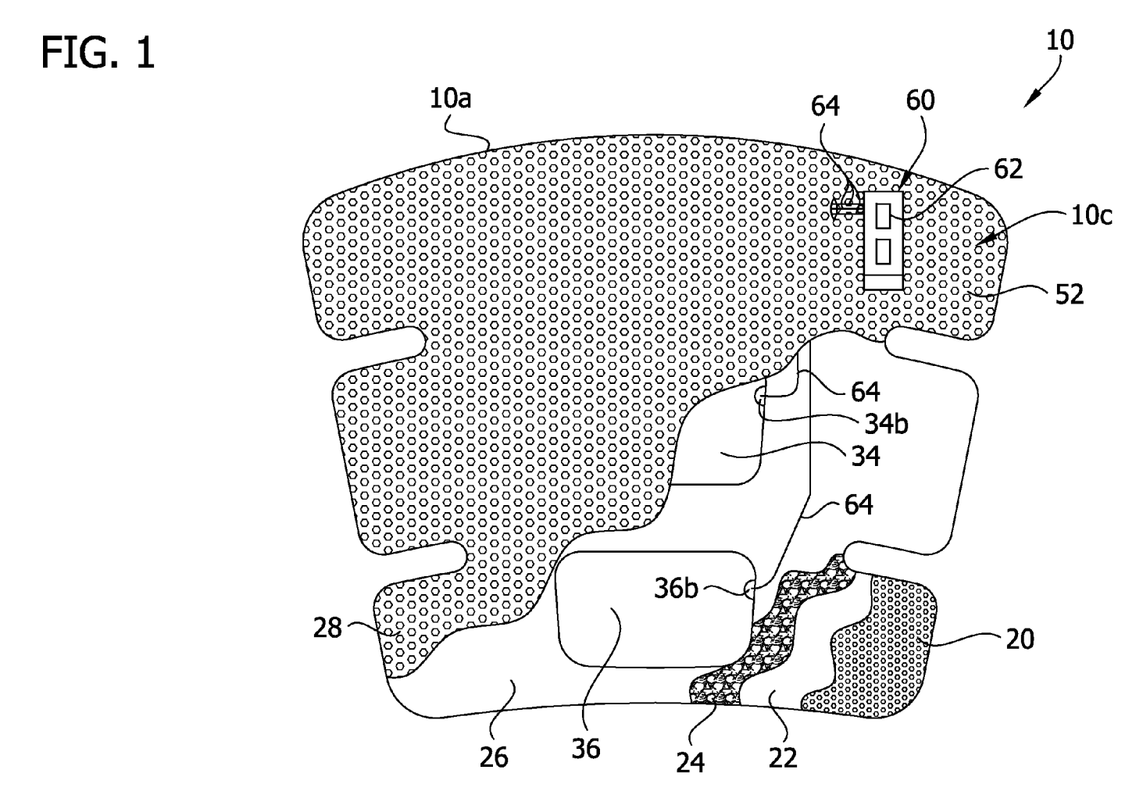
FIG. 1 is a schematic outer elevation of a compression garment of the present invention shown in an open, unwrapped configuration, an outer cover layer and intermediate layers of the sleeve being partially removed to show underlying layers.
Figure 2:
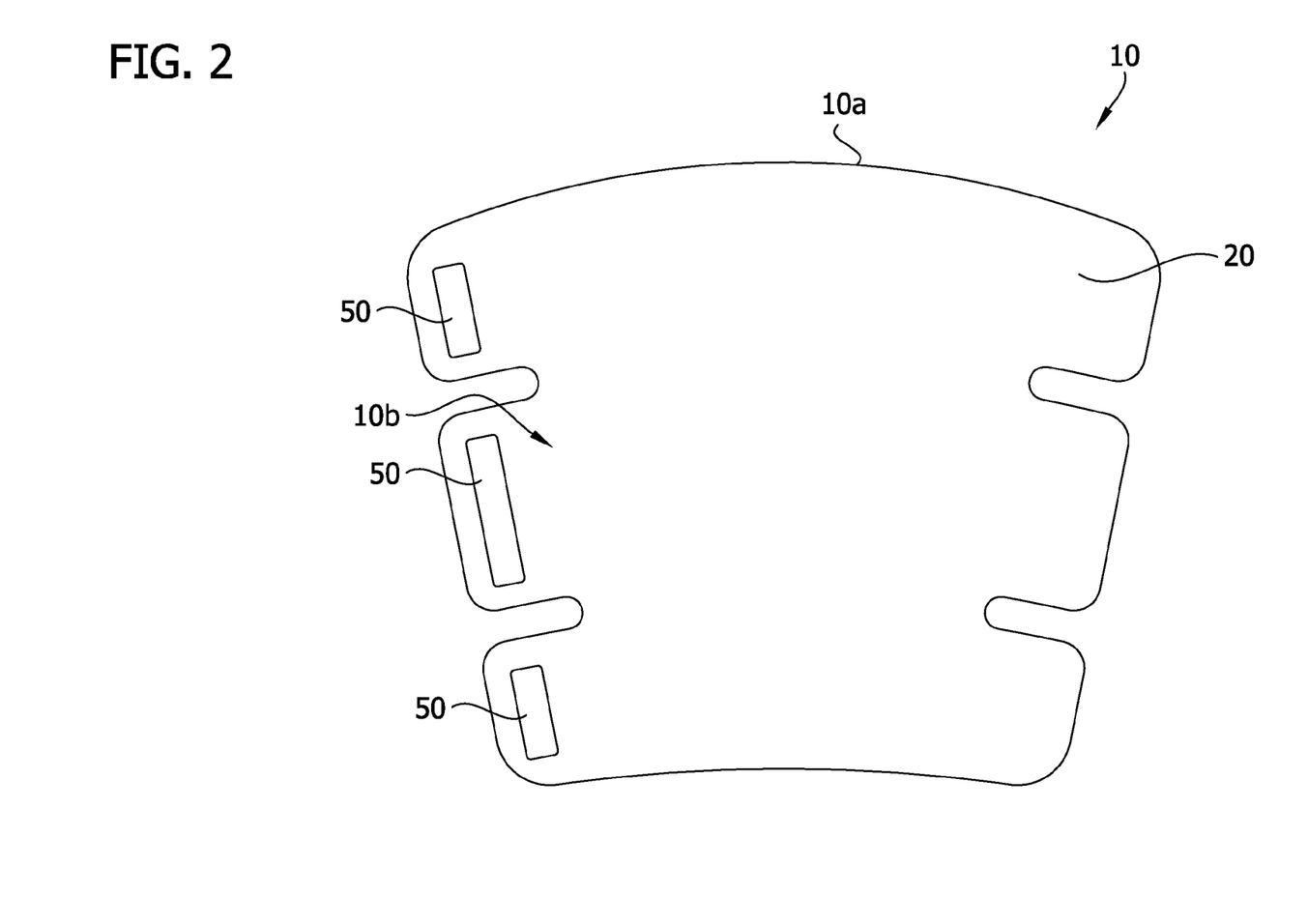
FIG. 2 is a schematic inner elevation of the compression garment.

Referring now to the drawings and in particular to FIGS. 1 and 2, one embodiment of a compression garment of the present invention is generally indicated by the reference number 10. The compression garment 10 is used for compressing a body part (e.g., a limb such as a leg or arm). The illustrated compression garment 10 is configured to be applied to a leg and has a "thigh length" size, meaning the compression garment extends generally from the ankle to the thigh. Other sizes and shapes of garments (e.g., "knee length," extending generally from the ankle to below the knee) and garments configured for use on other body parts may also be within the scope of the present invention.

Figure 3:
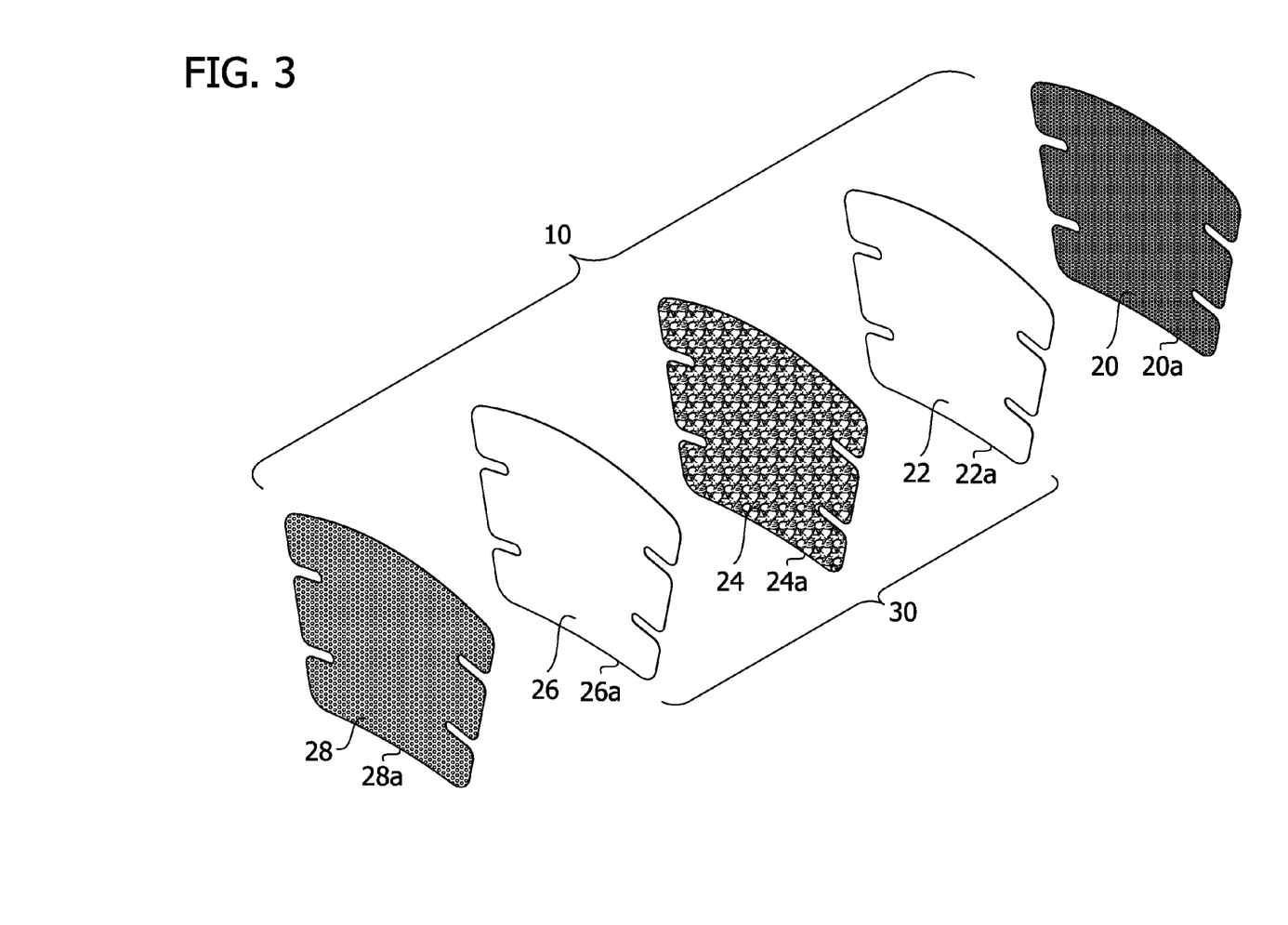
FIG. 3 is a separated perspective of the compression garment.

As shown in FIGS. 1 and 3, the compression garment 10 has a layered construction comprising five layers. More specifically, the compression garment 10 includes an inner cover layer 20, an inner bladder layer 22, a foam layer 24, an outer bladder layer 26, and an outer cover layer 28. As used herein, the terms "inner" and "outer" refer to the position of the layers when wrapped around the body part. For example, when the compression garment 10 is wrapped around the limb, the inner cover layer 20 is closer to the limb and the outer cover layer 28 is farther from the limb. In some embodiments, the inner and outer cover layers 20, 28 may be omitted without departing from the scope of the present invention.

The inner and outer bladder layers 22, 26 sandwich the foam layer 24 to form a bladder subassembly 30 (FIG. 4), and the inner and outer cover layers 20, 28 sandwich the bladder subassembly, positioning the layers in a stacked configuration. As shown in FIG. 3, the cover layers 20, 28, the bladder layers 22, 26, and the foam layer 24 have respective perimeters 20a, 28a, 22a, 26a, 24a. As illustrated, all of the layers 20-28 have generally the same size and shape. When the compression garment 10 is constructed, the perimeters 20a-28a are generally aligned with each other. The perimeters of the cover layers 20a, 28a define a perimeter of the compression garment 10a (FIG. 1). Compression garments having more or fewer layers may be within the scope of the present invention. For example, the cover layers 20, 22 may be omitted without departing form the scope of the present invention. Moreover, compression garments including layers having differing sizes and shapes may be within the scope of the present invention. For example, the layers 20-28 may have perimeters not aligned with each other as will be described in further detail below.

The layers 20-28 may be made of various materials. The cover layers 20 and 28 may comprise woven and non-woven cloth or fabric made of, for example, a polyester. The bladder layers 22, 26 desirably comprise gas-impermeable material so that at least one bladder may be formed between the layers, as described in further detail below. For example, the bladder layers 22, 26 may be a pliable PVC material having a thickness in a range from about 0.003 inches to about 0.015 inches. In one embodiment, the material is about 0.005 inches thick. In some embodiments, the foam layer 24 comprises closed cell foam such as polyethylene foam, but other types of foam may be used without departing from the scope of the present invention. Among other advantages, the foam layer 24 may provide structural support to the compression garment 10 to assist in preventing the compression garment from falling down the limb. Although the foam layer 24 may have other thicknesses without departing from the scope of the present invention, in one embodiment, the foam layer may have a thickness in a range of about 0.125 inches to about 0.5 inches. Further, in some embodiments the foam layer has a thickness of about 0.375 inches.

Figure 4:
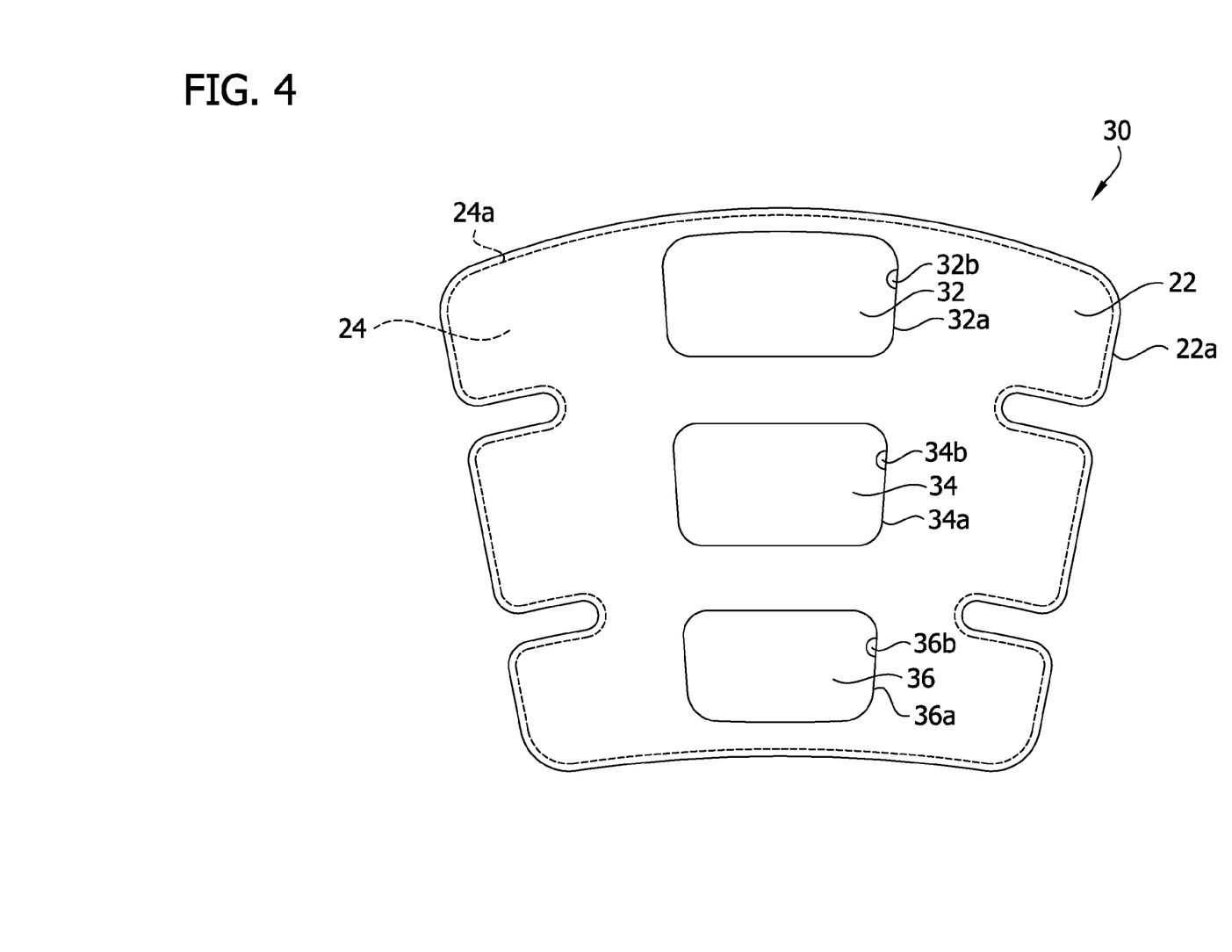
FIG. 4 is a schematic outer elevation of a bladder subassembly of the compression garment.

The inner and outer bladder layers 22, 26 are joined to form at least one bladder between the layers that is conformable to at least a portion of the body part on which the garment is worn. In some embodiments, the bladder subassembly 30 includes three bladders 32, 34, 36 as illustrated in FIG. 4. Compression garments having different numbers of bladders (e.g., one, two, four, or five) may be within the scope of the present invention. Each of the bladders 32, 34, 36 includes an inflatable chamber, also indicated by the reference numbers 32, 34, 36. The inflatable chambers 32, 34, 36 are inflated by delivering gas (e.g., air) to the chambers to apply compression to the body part. The bladder layers 22, 26 are joined, defining respective perimeters 32a, 34a, 36a of each of the inflatable chambers 32, 34, 36. For example, the bladder layers may be joined at their perimeters 32a, 34a, 36a by welding, such as radiofrequency welding or heat sealing. Other types of mechanical and/or chemical processes may be used to join the layers. Similar techniques may be used to join the bladder layers 22, 26 at other locations, such as around the perimeters 22a, 26a of the bladder layers. Moreover, similar techniques may be used to join the inner and outer cover layers 20, 28 to the bladder layers 22, 26 at locations such as around the perimeters 20a, 28a of the cover layers so the cover layers encase the inflatable chambers 32, 34, 36.

The bladder layers 22, 26 are joined with the foam layer 24 so that the foam layer is positioned in the inflatable chambers 32, 34, 36 and extends beyond the perimeters of the inflatable chambers 32a, 34a, 36a. The welds defining the perimeters 32a, 34a, 36a include the foam layer 24 to maintain the foam layer in position on the compression garment. The material forming the foam layer 24 may be selected for facilitating bonding (e.g., RF welding) of the foam layer 24 to the bladder layers 22, 26. Portions of the foam layer 24 positioned inside the inflatable chambers 32, 34, 36 also advantageously reduce chamber volume and thus the amount of gas required to inflate the inflatable chambers. The perimeter of the foam layer 24a of the embodiment illustrated in FIGS. 1-4 is larger than the perimeters of the inflatable chambers. In some embodiments, the perimeter of the foam layer 24a is positioned entirely outside the inflatable chambers 32a, 34a, 36a and is generally the same size as the perimeter of the compression garment 10a. The portions of the foam layer 24 in the inflatable chambers 32, 34, 36 have sizes and shapes generally corresponding to the sizes and shapes of the perimeters of the inflatable chambers 32a, 34a, 36a. The foam layer 24 provides structural support to the compression garment 10 to resist falling down the body part. In some embodiments, the foam layer 24 may be configured strategically for providing structural support to certain portions of the garment 10. In the illustrated embodiment, the foam layer 24 provides support to substantially all of the garment 10 because the foam layer has a size and shape generally corresponding to the full size and shape of the compression garment.

The foam layers may have other configurations without departing from the scope of the present invention. The foam layer 24 may have a size and shape different from the bladder layers 22, 26 and/or the cover layers 20, 28. The perimeter of the foam layer 24a may be smaller than the perimeters of the inflatable chambers 32a, 34a, 36a and/or be offset from the perimeters of the inflatable chambers so that only a segment of the welding defining the perimeters 32a, 34a, 36a incorporates the foam layer 24. The portion of the foam layer 24 inside one or more of the inflatable chambers 32, 34, 36 may be narrower than the perimeter of the corresponding inflatable chamber. The percentage of the foam layer 24 positioned outside the inflatable chambers may vary in different embodiments. For example, with respect to the inflatable chamber 32, at least sixty percent of the foam layer 24 may be positioned outside the inflatable chamber 32a. In other embodiments, other percentages of the foam layer such as 10, 20, 30, 40, or 50 percent of the foam layer may be positioned outside an inflatable chamber. Further, more than one foam layer may be used and each foam layer may be associated with different combinations of inflatable chambers. A foam layer may be positioned in one or more inflatable chambers and not others. Embodiments described in further detail below provide examples of some of these configurations of foam layers.

The compression garment 10 is configured to be wrapped around a body part and secured in position. For example, as shown in FIG. 2, sections of hook fabric 50 are provided on the inner cover layer 20 and spaced longitudinally along a side margin of the compression garment, generally indicated by the reference number 10b. The garment 10 is wrapped around the body part and secured in position by engaging the sections of hook fabric 50 with loop fabric 52 on the outer cover layer 28 on an opposite side margin of the compression garment, generally indicated by the reference number 10c (FIG. 1). Although compression garments having hook-and-loop fasteners are described, those skilled in the art will appreciate that other fastener types may be used to secure the garment 10 in position without departing from the scope of the present invention.

Referring again to FIG. 1, a controller, generally indicated by the reference number 60, may be mounted on the compression garment 10. The controller 60 includes a pressurizer 62 that regulates compression therapy applied to the body part on which the garment is worn by increasing and decreasing the gas pressure in the inflatable chambers 32, 34, 36. Conduits 64 disposed between the outer bladder layer 26 and the outer cover layer 28 connect the controller 60 to openings in the inflatable chambers 32b, 34b, 36b. For example, the controller 60 may be programmed to inflate and deflate the inflatable chambers 32, 34, 36 to apply intermittent, sequential compression therapy as known in the art. Other types of compression therapy may also be programmed without departing from the scope of the present invention. The foam layer 24 enables a smaller and/or lighter controller 60 to be used because the portions of the foam layer in the inflatable chambers 32, 34, 36 reduce the volume of gas required to inflate the inflatable chambers, thus decreasing demand on the controller 60. The foam layer 24 also provides structural support to the compression garment 10 to assist in preventing the garment 10 from slouching and/or collapsing on itself, which may happen at least in part due to the force of gravity acting on the controller 60. Other types of controllers 60, including controllers not supported by the compression garment 10, may be used without departing from the scope of the present invention.

Figure 5:
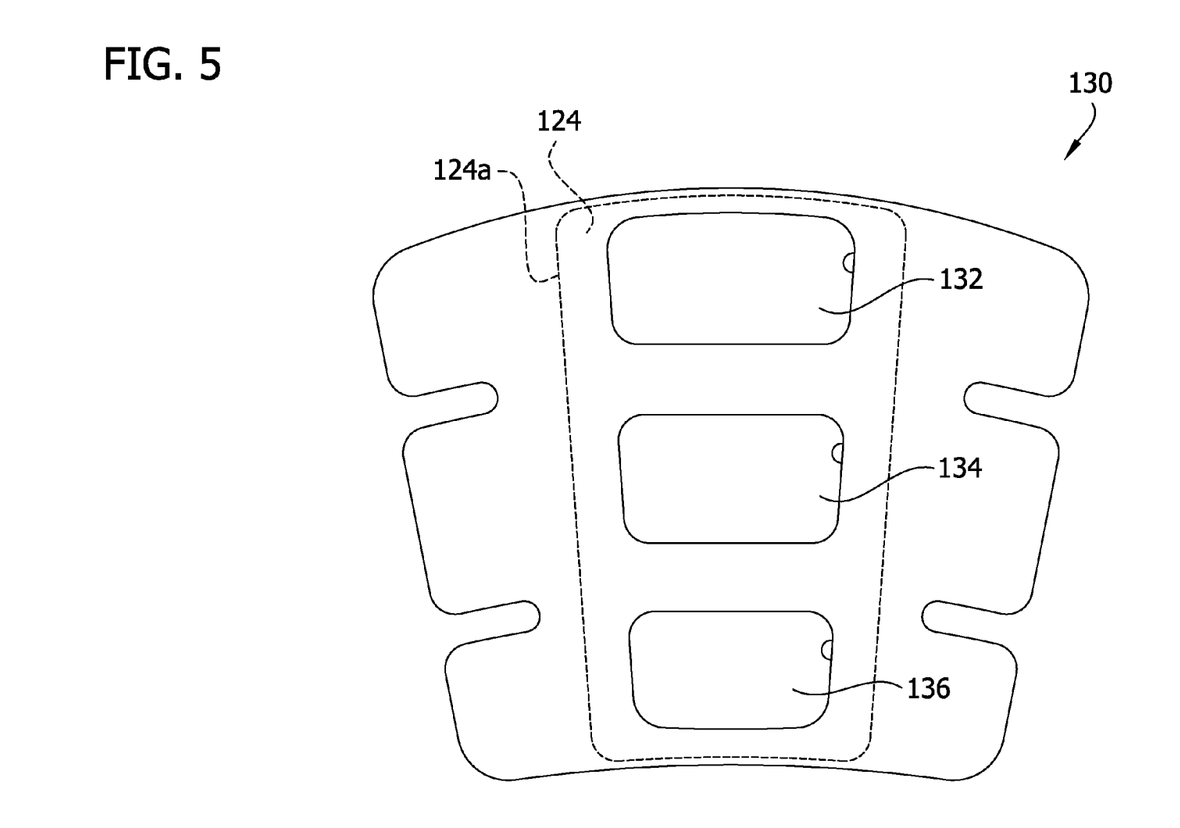
FIG. 5 is a schematic outer elevation of a second embodiment of a bladder subassembly of the present invention.
Figure 6:
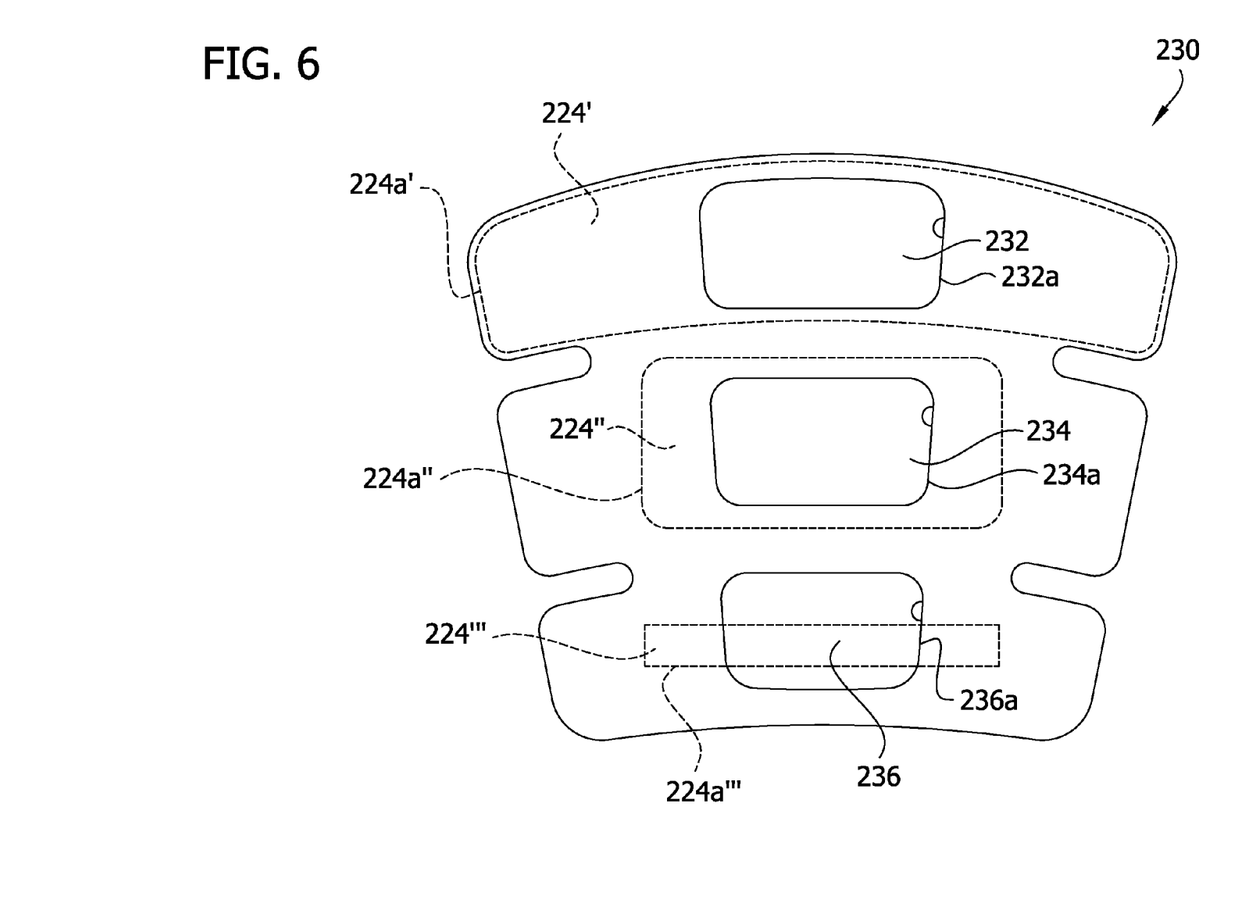
FIG. 6 is a schematic outer elevation of a third embodiment of a bladder subassembly of the present invention.
Figure 7:
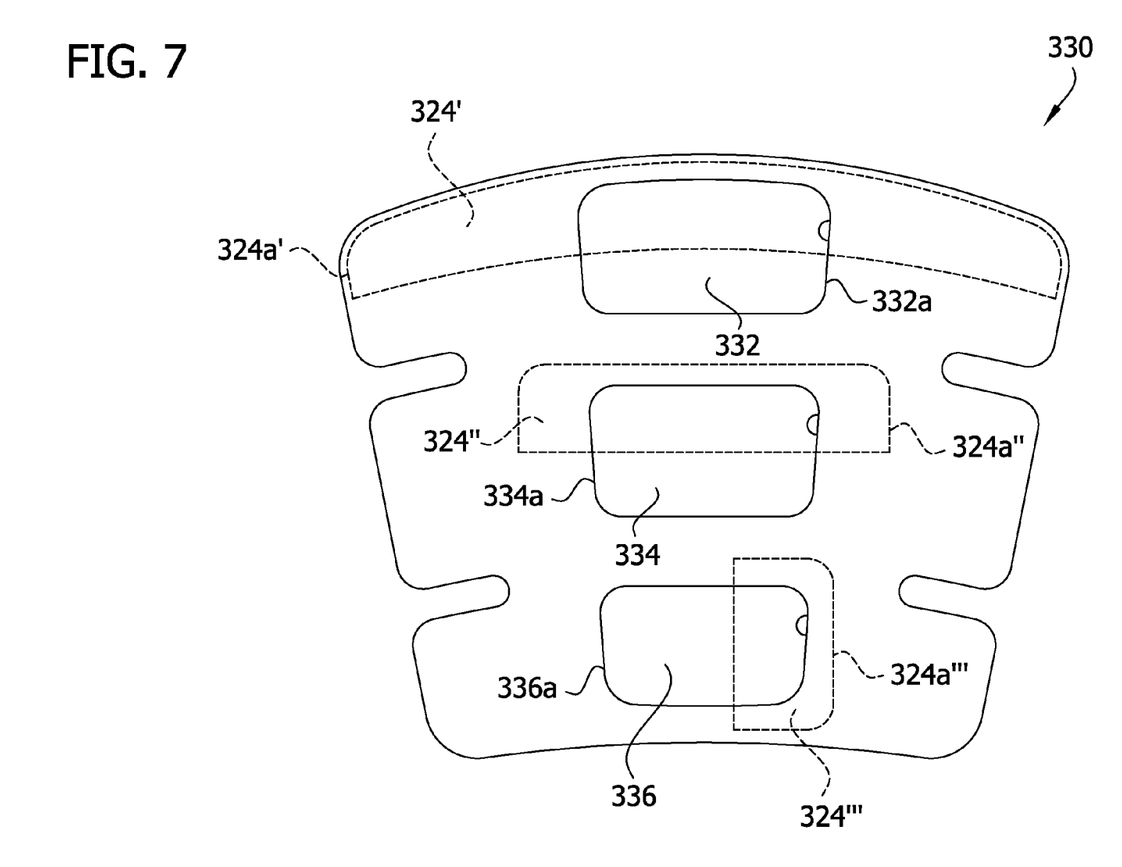
FIG. 7 is a schematic outer elevation of a fourth embodiment of a bladder subassembly of the present invention.

FIGS. 5, 6, and 7 illustrate additional embodiments of bladder subassemblies having different configurations of foam layers and generally indicated by the reference numbers 130, 230, and 330. The bladder subassemblies 130, 230, 330 are similar to the bladder subassembly 30 described above, and corresponding parts are indicated by corresponding reference numbers plus 100, 200, or 300. It is understood that the bladder subassemblies 130, 230, 330 may be used to construct compression garments similar to the garment 10 described above. For example, cover layers such as layers 20 and 28 described above or other cover layers may be joined to the bladder subassemblies 130, 230, 330.

Referring to FIG. 5, the bladder subassembly 130 of this embodiment includes a foam layer 124 having a perimeter 124a that is smaller than and shaped different from the perimeter of the compression garment 10a. The perimeter of the foam layer 124a is larger than and is positioned entirely outside of the inflatable chambers 132, 134, 136.

Referring to FIG. 6, the bladder subassembly 230 of this embodiment includes three foam layers 224', 224", 224"', each associated with a respective individual inflatable chamber 232, 234, 236. The first foam layer 224' is generally rectangular and has a perimeter 224a' that is larger than the perimeter of the inflatable chamber 232a, and the perimeter 224a' is positioned entirely outside the inflatable chamber 232. At least sixty percent of the foam layer 224' is positioned outside the inflatable chamber 232. The second foam layer 224" is similar to the foam layer 224' but has a smaller size. The foam layer 224" has a perimeter 224a" that is larger than the perimeter of the inflatable chamber 234a. At least forty percent of the foam layer 224" is positioned outside the inflatable chamber 234. The third foam layer 224"' is smaller than the foam layer 224" and has a perimeter 224a"' that is not positioned entirely outside the inflatable chamber 236. Segments of the weld defining the perimeter of the inflatable chamber 236a at the left and right sides of the inflatable chamber 236 pass through the foam layer 224"'. The portion of the foam layer 224"' inside the inflatable chamber 236 is smaller than the perimeter of the inflatable chamber 236a. About fifty percent of the foam layer 224"' is positioned outside the inflatable chamber 236.

Referring to FIG. 7, the bladder subassembly 330 of this embodiment includes three foam layers 324', 324", 324"', each associated with a respective individual inflatable chamber 332, 334, 336. The first foam layer 324' is sized about the same as the top half of the foam layer 224' described above. The perimeter of the foam layer 324a' is not positioned entirely outside the inflatable chamber 332. At least sixty percent of the foam layer 324' is positioned outside the inflatable chamber 332. Segments of the weld defining the perimeter of the inflatable chamber 332a pass through the foam layer 324' at the left, right, and upper sides of the inflatable chamber 332. The second foam layer 324", which has a perimeter 324a", is similar to the foam layer 324' but is smaller. At least forty percent of the foam layer 324" is positioned outside the inflatable chamber 334. Regarding the third foam layer 324"', the perimeter of the foam layer 324a"' is not positioned entirely outside the inflatable chamber 336, and segments of the weld defining the perimeter of the foam layer 336a pass through the foam layer at upper right, lower right, and right sides of the inflatable chamber 336.

It is understood that a bladder subassembly may include any combination of foam layers such as 224', 224", 224"', 324', 324", or 324"'. For example, a bladder subassembly may include the foam layer 224' associated with each of its inflatable chambers. Moreover, a bladder subassembly may include one or more of the foam layers 224', each associated with different inflatable chambers and different foam layers such as layers 224", 224"', 324', 324", or 324"', each associated with other inflatable chambers.

Figure 8:
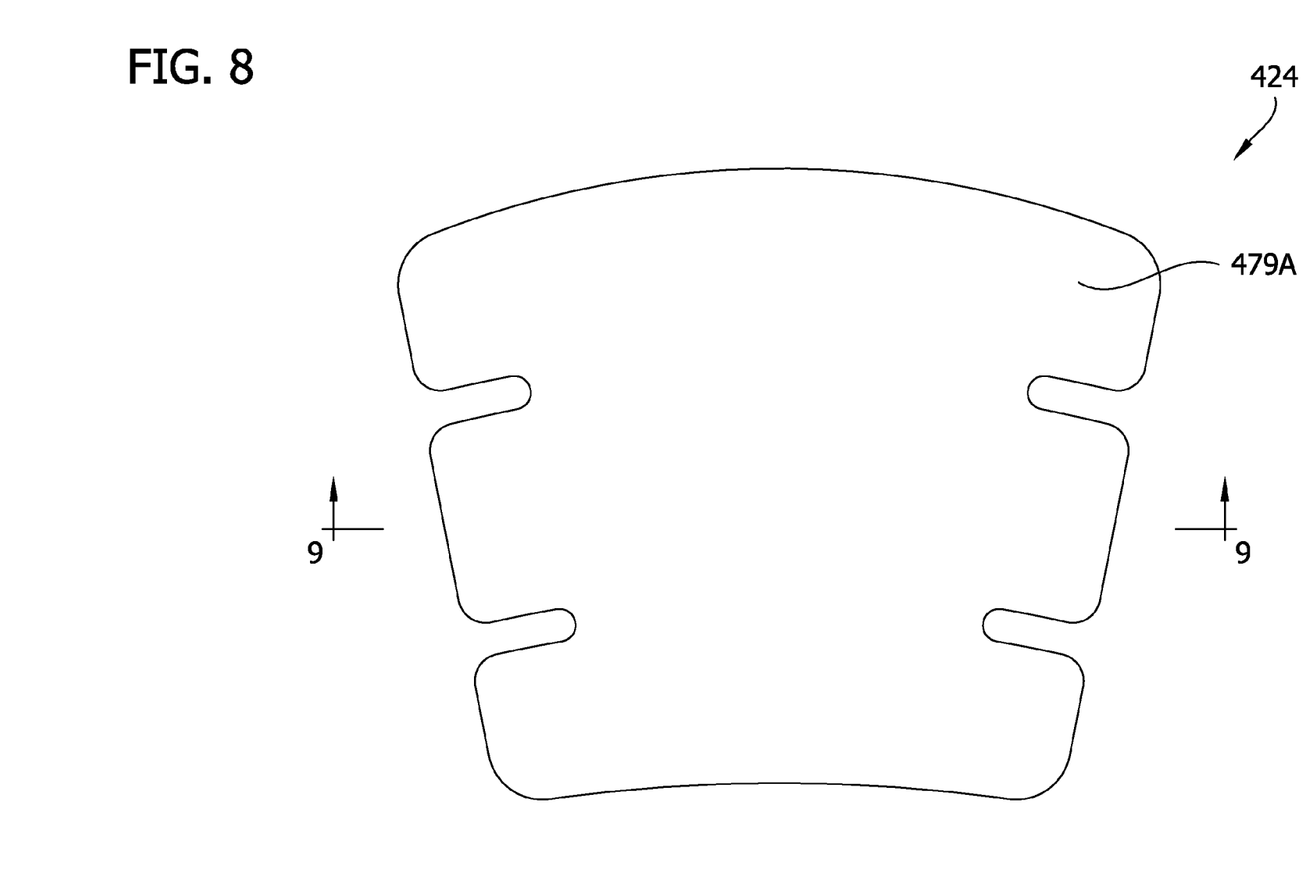
FIG. 8 is a schematic outer elevation of another embodiment of a foam layer of the present invention.
Figure 9:
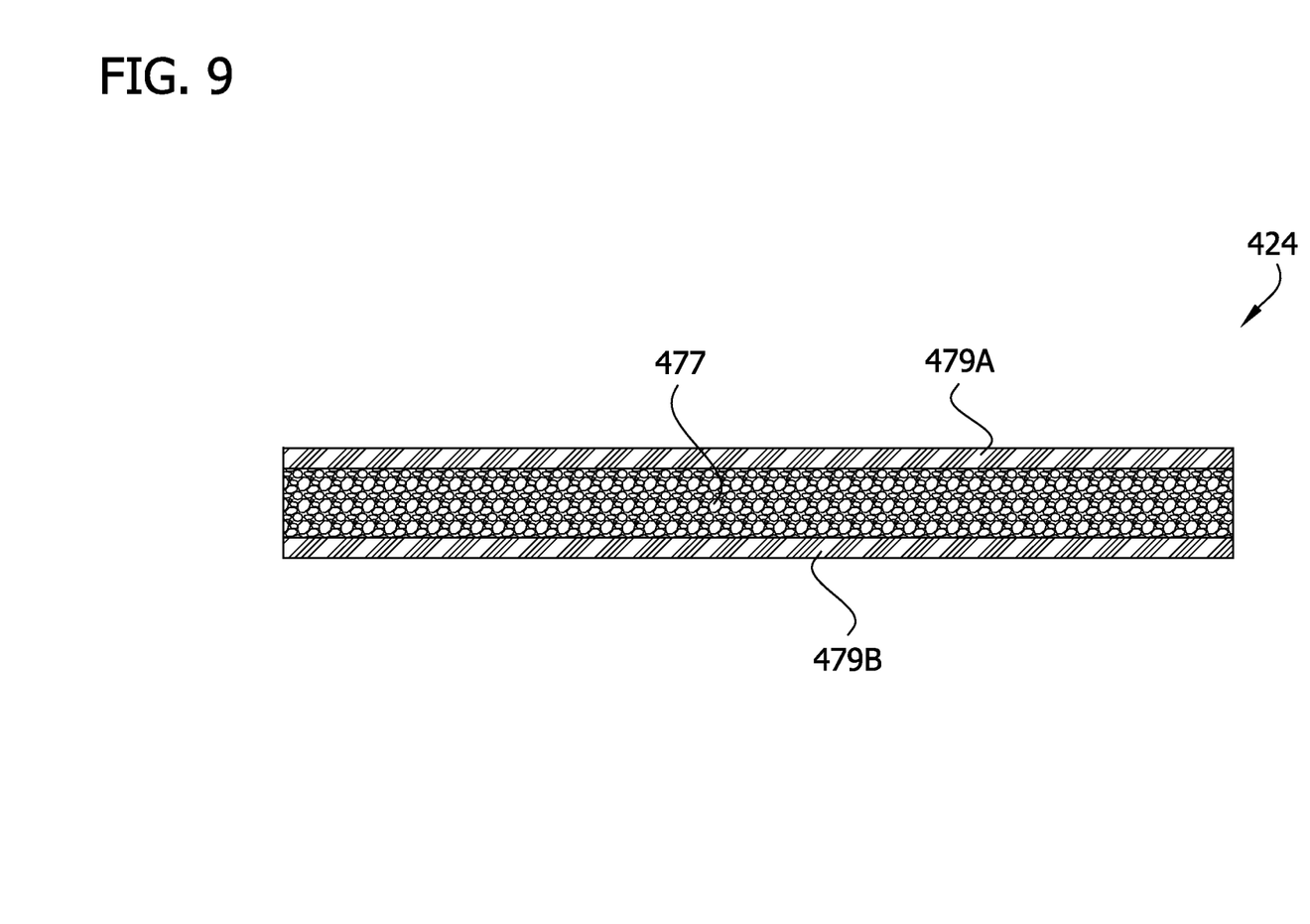
FIG. 9 is a schematic section of the foam layer of FIG. 8 taken in the plane including line 9-9 in FIG. 8, the thickness of the foam layer being exaggerated to illustrate construction of the foam layer.

FIG. 8 illustrates a foam layer 424 having a profile or shape that is similar to the foam layer 24 described above. The foam layer 424 may be used to form a compression garment such as the garment 10 shown in FIGS. 1-4. FIG. 9 illustrates the foam layer 424 in section. The thickness of the foam layer 424 is exaggerated in FIG. 9 to illustrate the construction of the foam layer 424. In this embodiment, the foam layer 424 includes foam material 477 sandwiched between inner and outer bonding layers 479A, 479B. The bonding layers 479A, 479B may include a suitable material, such as PVC, that facilitates bonding the foam layer to bladder layers such as the layers 22, 26 described above. The bonding layers 479A, 479B may be applied to the foam layer using a suitable method, such as lamination, extrusion, adhesion, or other methods.

The bonding layers 479A, 479B may have profiles generally the same as the profile of the foam material 477. In other words, the bonding layers 479A, 479B extend across substantially an entire width and height of the foam layer 424. The bonding layers 479A, 479B may have other profiles (e.g., different from the profile of the foam material 477) without departing from the scope of the present invention.

It is envisioned that other foam layers such foam layers described herein other than foam layer 424 may include bonding layers similar to the layers 479A, 479B.

As will be understood by those skilled in the art, various suitable methods may be used for joining, connecting, or bonding any of the various components of a compression garment according to the present invention. For example, methods such as ultrasonic welding, heat sealing, adhesives, and other methods may be used.

In a cycle of use, the compression garment 10 is applied to a body part, and the controller 60 is activated to apply compression therapy on the body part. Depending upon the configuration of the compression garment 10 and the programming of the controller 60, intermittent sequential compression therapy or other types of compression therapy may be applied.

When introducing elements of the present invention or the preferred embodiments(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A compression garment for applying compression therapy to a body part of a person, the compression garment comprising:
    a bladder configured to conform to at least a portion of the body part, the bladder including an inflatable chamber for applying compression therapy to the body part, the inflatable chamber having a perimeter and an opening through which the inflatable chamber is inflated; and
    a foam layer positioned in the inflatable chamber for reducing a volume of gas required to inflate the inflatable chamber, the foam layer extending outside the inflatable chamber for providing structural support to the compression garment;
    wherein a perimeter of the foam layer is positioned entirely outside the inflatable chamber, and wherein the bladder includes first and second fluid-impermeable bladder layers, the bladder layers being disposed in stacked relationship and being joined to define the inflatable chamber between the bladder layers such that when the inflatable chamber is being inflated the foam layer in the inflatable chamber is in direct contact with gas inflating the inflatable chamber.

2. A compression garment as set forth in claim 1 wherein the foam layer comprises closed cell foam.

3. A compression garment as set forth in claim 1 wherein the bladder layers are joined by a weld that defines the perimeter of the inflatable chamber.

4. A compression garment as set forth in claim 3 wherein at least a segment of the weld that defines the perimeter of the inflatable chamber includes the foam layer.

5. A compression garment as set forth in claim 1 wherein the compression garment further comprises inner and outer cover layers, the cover layers being positioned on opposite sides of the bladder and joined to encase the inflatable chamber.

6. A compression garment as set forth in claim 5 wherein the cover layers have a perimeter defining a perimeter of the compression garment, and the perimeter of the foam layer has a size larger than the perimeter of the inflatable chamber and less than the perimeter of the compression garment.

7. A compression garment as set forth in claim 5 wherein the cover layers have a perimeter defining a perimeter of the compression garment, and the perimeter of the foam layer has a size and shape generally corresponding to a size and shape of the perimeter of the compression garment.

8. A compression garment as set forth in claim 1 wherein at least twenty percent of the foam layer is positioned outside the inflatable chamber.

9. A compression garment as set forth in claim 8 wherein at least forty percent of the foam layer is positioned outside the inflatable chamber.

10. A compression garment as set forth in claim 9 wherein at least sixty percent of the foam layer is positioned outside the inflatable chamber.

11. A compression garment as set forth in claim 1 wherein the portion of the foam layer positioned in the inflatable chamber has a size and shape generally corresponding to the size and shape of the perimeter of the inflatable chamber.

12. A method of making a compression garment for applying compression therapy to a body part of a person, the method comprising:
    sandwiching a foam layer between first and second fluid-impermeable bladder layers so the foam layer and first and second bladder layers are positioned in a stack;
    joining the bladder layers to form an inflatable chamber between the bladder layers such that the foam layer is positioned in the inflatable chamber and extends out of the inflatable chamber such that a perimeter of the foam layer is positioned entirely outside the inflatable chamber; and
    forming an opening in at least one of the bladder layers to allow for inflation of the inflatable chamber such that when the inflatable chamber is being inflated the foam layer in the inflatable chamber is in direct contact with gas inflating the inflatable chamber.

13. A method as set forth in claim 12 wherein joining the bladder layers includes welding the bladder layers to define a perimeter of the inflatable chamber.

14. A method as set forth in claim 13 wherein at least a segment of the weld that defines the perimeter of the inflatable chamber is made through the foam layer.

15. A method as set forth in claim 13 further comprising positioning inner and outer cover layers on opposite sides of the first and second bladder layers and joining the inner and outer cover layers to encase the inflatable chamber.

16. A method as set forth in claim 12 wherein the first and second bladder layers have respective perimeters that have generally the same shape and size, the method further comprising, before joining the bladder layers, aligning the perimeters of the bladder layers in registration with each other and positioning the perimeter of the foam layer out of registration with the bladder layers.

* * * * *